: 3,407,247
Patented Oct. 22, 1968

3,407,247
PROCESS FOR THE PRODUCTION OF FLUORO-OLEFIN COPOLYMERS
Heinz F. Reinhardt, Claymont, Del., assignor to E. I. du Pont de Nemours and Company, Wilmington, Del., a corporation of Delaware
No Drawing. Filed Mar. 28, 1966, Ser. No. 537,652
8 Claims. (Cl. 260—881)

ABSTRACT OF THE DISCLOSURE

A two stage process for producing fluoroolefin copolymers useful in making paints, lacquers and similar finishes is provided by (a) polymerizing a monomer such as methyl methacrylate, t-butyl methacrylate, methacrylonitrile, methacrylamide and phenyl methacrylate in an aqueous emulsion in the presence of a polymerization initiator and (b) reacting the prepolymer so formed with a fluoroolefin compound by adding the fluoroolefin compound to the prepolymer mixture.

---

This invention concerns a process for producing a polymeric coating composition and more particularly a process for producing a fluoroolefin copolymer having improved coating characteristics.

One-stage processes for the preparation of methyl methacrylate and fluoroolefin copolymers are known in the art, (e.g., U.S. Patents 2,419,009 and 2,468,664). In a one-stage process, the methyl methacrylate monomer and fluoroolefin monomer are charged together initially into a reaction vessel. Because there is a significant difference in the reactivities of the two monomers, an induction period normally occurs. One disadvantage of such a one-stage process is the impracticability of carrying the reaction out in a continuous manner because of the induction period. Another disadvantage is that adequate temperature control of the reaction is practically impossible if all of the fluoroolefin is charged at once to the reaction vessel.

According to this invention, there is provided a two-stage process for preparing fluoroolefin copolymers which consists essentially of:

A. a first stage of polymerizing at least one of the monomers selected from the group of methyl methacrylate, t-butly methacrylate, methacrylonitrile, methacrylamide, and phenyl methacrylate in an aqueous emulsion in the presence of a polymerization initiator which produces active reaction sites on the resulting prepolymer, and B. a second stage of reacting the resulting prepolymer with a fluoroolefin compound by adding the fluoroolefin compound to the reaction mixture of the first stage and maintaining a mixture of these in an aqueous emulsion at a temperature of about 0° C. to about 125° C. to produce a fluoroolefin copolymer.

One advantage of the two-stage process of this invention over a one-stage process is that the prepolymer can be prepared by reacting thse monomers which can be acti- the fluoroolefin. This prepolymer can then be reacted with a fluoroolefin without an induction period. Another advantage is the excellent temperature control which can be maintained during the fluoroolefin copolymerization by adding the fluoroolefin to the prepolymer in a stepwise manner.

This process yields a finely dispersed form of fluoroolefin copolymers which have the attractive properties of excellent formability, thermal stability and film formation. Such polymers are useful in making durable and formable paints, lacquers and similar finishes.

In the first stage of this process, a prepolymer is prepared. The prepolymer can be either a homopolymer of certain monomers which can be activated or a copolymer prepared by reacting these monomers which can be activated with any other vinyl monomer capable of polymerization with them. Examples of vinyl monomers useful for preparation of the prepolymer include t-butyl methacrylate, methacrylic acid, acrylic acid, methyl acrylate, acrylonitrile, methacrylonitrile, vinyl acetate, vinyl chloride, vinylidene chloride, methyl vinyl ketone, ethylene, propylene, butadiene, 3-(2 - methacryloxyethyl-2,2-spiro-cyclohexyl oxazolidine, phenyl acrylate, acrylamide, styrene, α-methyl styrene, vinyl toluenes, acrylic acid anhydride, fumaric acid, crotonic acid, allyl acetate, glycidyl methacrylate, t-butylaminoethyl methacrylate, hydroxyalkyl acrylates, hydroxyalkyl methacrylates, β-hydroxyethyl vinyl ether, β-hydroxyethyl vinyl sulfide, vinyl pyrrolidone, N,N-dimethylaminoethyl methacrylate, hexafluoropropylene, lower alkyl vinyl ethers in which the alkyl group has 1 to 4 carbon atoms, p-methoxy-α-methyl-styrene, vinylidene cyanide, esters of α-cyano-acrylic acid, N,N - dialkylacrylamides, N,N - dialkylmethacrylamides, itaconic acid esters, vinyl esters of a fatty acid having one to eighteen carbon atoms and esters of methacrylic acid with an alcohol having one to eighteen carbon atoms.

It is essential that the prepolymer contain a monomer which can be activated. The active sites can be formed on methyl methacrylate, t-butyl methacrylate, methacrylonitrile, methacrylamide and phenyl methacrylate. The only requirement for the other vinyl monomer is that it be able to polymerize with the monomer which can be activated to form a prepolymer useful for reacting with fluoroolefins.

When the prepolymer is prepared in the form of a copolymer having one monomer which can be activated and another vinyl monomer which cannot be activated, the mole ratio of the monomer which can be activated to the other vinyl monomer affects the rate of formation of the product fluoroolefin copolymer. Low ratios provide decreased rates. It is preferred to use a mole ratio of at least 3 to 1 to obtain satisfactory fluoroolefin copolymer formation rates.

The concentration of monomers in the first stage of this process is not critical. The lower limit is determined by the practical consideration of obtaining a significant prepolymer yield and the upper limit is determined by the amount of monomers which can be kept dispersed in the emulsion.

Any initiator which produces a prepolymer having active sites is useful for this invention. Representative of such initiators are ultraviolet radiation, high energy radiation, alkali metal persulfates such as sodium and potassium persulfate, and a mixture of an alkali metal persulfate and an inorganic reducing agent such as sodium metabisulfite and sodium hypophosphite. The term high energy radiation refers to gamma radiation. A preferred initiator is a mixture of potassium persulfate and sodium metabisulfite because this initiator produces a prepolymer having a high reactivity, good reproducibility and it yields a high conversion of fluoroolefin monomer to fluoroolefin copolymer. Unsuitable initiators include benzoyl peroxide, azobisisobutyronitrile and di-tertiary butyl peroxide. These give insignificantly low conversions or result in a polymerization reaction which is uncontrollable.

Dispersing agents in general can be used in this invention. Any of the dispersing agents in the art such as sodium lauryl sulfate, alkyl phosphates, and polyglycol ethers can be used. The use of sodium lauryl sulfate or a fluoroalkyl phosphate free acid sold by E. I. du Pont de Nemours & Co. under the trademark "Zonyl" S–13 in a vinyl fluoride/methyl methacrylate copolymerization permits particularly good control of product particle size and the resulting copolymers have excellent thermal stability. A vinylidene fluoride/methyl methacrylate copolymerization, on the other hand, when carried out without the addition of a dispersing agent normally results in higher polymer yields than when an agent is used.

Stage one of this process can be carried out using conventional emulsion polymerization conditions, but the reaction of the fluoroolefin in stage two is carried out under pressure except for the case where the fluoroolefin is a fluorinated styrene in liquid form. In this case, stage two can be carried out under atmospheric pressure. It is not necessary, however, that stage two follow stage one immediately. The prepolymer of stage one can be stored for extended periods of time before reaction with the fluoroolefin, the length of time depending on the conditions of storage. Stage two can be carried out using a prepolymer of polymethyl methacrylate stored without cover for a period of one week. It is desirable to avoid agitating the prepolymer in the presence of air or oxygen because oxygen decreases the activity of the prepolymer. If the prepolymer is sealed under an inert atmosphere, it will apparently remain active indefinitely.

Contacting the fluoroolefin with the prepolymer in stage two can be done by any practical method. Injecting the fluoroolefin into the prepolymer is a convenient method which allows very close temperature control over the reaction.

A wide range of fluoroolefins can be used in stage two to form useful polymeric compositions. Among these are vinyl fluoride, vinylidene fluoride, trifluoroethylene, tetrafluoroethylene, chlorotrifluoroethylene, difluorodichloroethylene, $\alpha,\beta,\beta$-trifluoro styrene, $\alpha$-chloro-$\beta,\beta$-difluoro styrene, $\beta,\beta$-difluoro styrene, $\alpha,\beta$-difluoro styrene, $\alpha$-fluoro-$\beta,\beta$-dichloro styrene, chloro-$\alpha,\beta,\beta$-trifluoro styrene, 2,4,6-trichloro-$\alpha,\beta,\beta$-trifluoro styrene, fluoro-$\alpha,\beta,\beta$-trifluoro styrene, 2,4,6-trifluoro-$\alpha,\beta,\beta$-trifluoro styrene.

Compounds of the structural formula

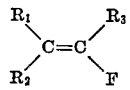

wherein any two of $R_1$, $R_2$ and $R_3$ are individually selected from $C_1$–$C_4$ alkyls and the third is selected from hydrogen, fluorine and chlorine, are included among the fluoroolefins useful in stage two of this invention. By the term $C_1$–$C_4$ alkyls is meant methyl, ethyl, propyl, isopropyl, butyl, isobutyl and sec.-butyl.

The copolymer product of stage two is recovered from the emulsion by ordinary techniques such as evaporation of the aqueous medium or coagulation of the polymer.

In a preferred embodiment of this invention, a prepolymer, polymethyl methacrylate, is prepared using conventional emulsion polymerization conditions and reacted in pressure equipment with vinyl fluoride or vinylidene fluoride to form a copolymer of methyl methacrylate and vinyl fluoride or vinylidene fluoride. These copolymers are more economical to produce than vinyl fluoride or vinylidene fluoride homopolymers and yet possess many of the properties of these homopolymers such as good formability, thermal stability and film formation.

The formability of films cast from the various vinyl fluoride and vinylidene fluoride copolymers decreases with increasing amounts of methyl methacrylate. This is illustrated in Table I which gives the results of a bump test for vinyl fluoride (VF) and vinylidene fluoride (VF$_2$)/methyl methacrylate (MMA) copolymers produced by reacting varying amounts by weight of the monomers.

The bump test is a laboratory method for determining the relative formabilities of polymers. A coating of the polymer is applied to a depth of approximately one mil on a 25 mil aluminum sheet to form a sample. A hemispherical plunger is placed with its curved surface upon the sample either on the coated side or the uncoated side as desired. A guided metal block weighing 1454 grams is then dropped from a height of 20.5 inches so that it lands on the center of the plunger to produce a concave or convex impression in the coating depending upon whether the plunger is on the coated or uncoated side. The impressions are compared with standards for cracking and adhesion of the coating and graded from one to ten, one representing a complete loss of adhesion with extreme cracking and brittleness and ten representing the absence of visible failure of adhesion and visible cracking.

TABLE I.—BUMP TEST

| Polymer Weight Ratio | Concave | Convex |
| --- | --- | --- |
| 75 VF/25 MMA | 10 | 10 |
| 50 VF/50 MMA | 8 | 9 |
| 25 VF/75 MMA | 5 | 5 |
| 75 VF$_2$/25 MMA | 10 | 10 |
| 50 VF$_2$/50 MMA | 9 | 9 |
| 25 VF$_2$/75 MMA | 5 | 4 |

The polymer coatings in Table I were prepared under varied conditions with regard to solids content of dispersion, solvent and time of baking. As can be seen from these results, the copolymers prepared by the process of this invention compare favorably in formability to homopolymers of vinyl fluoride (bump test: concave 10, convex 10) and vinylidene fluoride (bump test: concave 10, convex 10). Methyl methacrylate homopolymer has poor formability (bump test: concave 3, convex 3).

The following examples illustrate the invention. Unless otherwise specified, all parts and percentages are by weight.

Example I

The following ingredients are charged to a three neck round bottom flask fitted with a thermometer, nitrogen inlet, glass paddle stirrer and a reflux condenser:

|  | Parts |
| --- | --- |
| Methyl methacrylate (0.1% hydroquinone) | 25 |
| Potassium persulfate | 0.6 |
| Sodium metabisulfite | 0.2 |
| Sodium lauryl sulfate | 1.0 |
| Dibasic sodium phosphate (7 waters of hydration) | 1.5 |
| Deoxygenated water | 250 |

The mixture is heated to 85° C. with stirring (approximately 450 r.p.m.) under a slow stream of nitrogen over a period of fifteen minutes. The cloudy mixture is stirred at 85° C. for 45 minutes and then cooled to about 50° C. and transferred to a shaker tube mounted with an injection system. The injection system and shaker tube are flushed thoroughly with nitrogen and then the shaker tube is heated to 73° C. At this point, 75 parts of vinyl fluoride is injected and the pressure adjusted to 1500 to 1850 p.s.i. by water injection. The pressure is held constant by additional water injection until no further pressure drop occurs and the temperature is held at 70° C. to 80° C. The solid polymer obtained is filtered and then slurried three times with 250 parts of distilled water in a blender, filtered, rinsed with methanol and dried.

About 94 parts of a white polymer is obtained with a fluorine analysis of 29.46% (weight ratio of approximately 2.6 vinyl fluoride units/1.0 methyl methacrylate units). The white polymer is insoluble in methyl ethyl ketone, butyrolactone and toluene. A film cast from a 15% solids dispersion in butyrolactone on "Alodine" aluminum (six mil blade, baked for three minutes at 210° C.) is colorless, has good flow on baking and excellent formabiilty (bump test: concave 10, convex 10). "Alodine" aluminum is manufactured by the Amchem Products Co., Inc. of Ambler, Pa. and is a specially prepared aluminum that has undergone a treating process to provide a surface having improved adhesion characteristics and corrosion resistance. The inherent viscosity of this copolymer measured in a 0.5% hexamethylphosphoramide solution at 25° C. is 1.88.

Example II

A charge is used consisting of:

| | Parts |
|---|---|
| Methyl methacrylate (uninhibited) | 50 |
| Potassium persulfate | 0.6 |
| Sodium metabisulfite | 0.2 |
| Dibasic sodium phosphate (7 waters of hydration) | 1.0 |
| Deoxygenated water | 250 |

The methyl methacrylate prepolymer is prepared as in Example I and then transferred to a shaker tube mounted with an injection system. The injection system and shaker tube are flushed thoroughly with nitrogen and the prepolymer is heated to 85° C. Fifty parts of vinylidene fluoride (distilled) is injected and the pressure is raised to approximately 6000 p.s.i. by water injection and the temperature and pressure are maintained until no further pressure drop is observed.

The main pressure drop occurs in the first two hours, but the mixture is left in the shaker tube where it is maintained at 85° C. for a total of six hours. A very fine white dispersion which runs through a fine filter is obtained. The aqueous medium is evaporated and the product copolymer dried in an air-circulation oven at 50° C. Yield is 94 parts of copolymer. The copolymer is slurried with 400 parts of distilled water in a blender, filtered and dried. Its fluorine analysis is 28.41% (weight ratio of approximately 1.0 vinylidene fluoride units/1.0 methyl methacrylate units). It is soluble in cyclohexanone, partially soluble in methyl ethyl ketone and partially soluble in butyrolactone. A film cast from a 15% solids cyclohexanone solution on "Alodine" aluminum (six mil blade, baked for three minutes at 180° C.) has good formability (bump test: concave 9, convex 9).

Example III

The following ingredients are charged to a three neck round bottom flask fitted with a thermometer, nitrogen inlet, glass paddle stirrer and reflux condenser:

| | Parts |
|---|---|
| Methyl methacrylate (0.1% hydroquinone) | 12.5 |
| t-Butyl methacrylate (100 p.p.m. methoxy hydroquinone) | 1.5 |
| Sodium lauryl sulfate | 1.0 |
| Potassium persulfate | 0.6 |
| Sodium metabisulfite | 0.2 |
| Dibasic sodium phosphate (7 waters of hydration) | 0.75 |
| Deoxygenated water | 250 |

This mixture is heated with stirring under a slow stream of nitrogen to 85° C. over thirty minutes and maintained at 85° C. for one hour. A fine dispersion results which is then transferred to an autoclave having an injection system where 37.5 parts of vinyl fluoride is injected at 79° C. Water is injected until the pressure is raised to 1800 p.s.i. The pressure is maintained at 1500 to 1800 p.s.i. by additional water injection and the temperature is maintained at 77° C. to 81° C. for one hour and thirty minutes.

A very fine white polymer dispersion is obtained. The water is evaporated in an air-circulation oven at 50° C., after which the polymer is washed several times with water, filtered and dried. The yield is 49 parts of terpolymer.

A film cast from a twenty percent dispersion in butyrolactone on "Alodine" aluminum (six mil blade, baked for three minutes at 210° C.) is glossy and colorless and has excellent formability (bump test: concave 10 convex 10). The fluorine analysis is 29.21% (weight ratio of approximately 2.5 vinyl fluorine units/1.0 methyl methacrylate units).

What is claimed is:
1. A two-stage process for preparing fluoroolefin copolymers which consists essentially of:
   (a) a first stage which consists essentially of polymerizing a monomer selected from the group consisting of methyl methacrylate, t-butyl methacrylate, methacrylonitrile, methacrylamide and phenyl methacrylate in an aqueous emulsion in the presence of a polymerization initiator which produces active reaction sites on the resulting prepolymer,
   (b) a second stage which consists essentially of reacting the resulting prepolymer with a fluoroolefin compound by adding the fluoroolefin compound to the reaction mixture of the first stage and maintaining a mixture of these in an aqueous emulsion at a temperature of about 0° C. to 125° C. to produce a fluoroolefin copolymer.
2. The process of claim 1 in which methyl methacrylate is polymerized in the first stage resulting in a methyl methacrylate prepolymer.
3. The process of claim 2 in which methyl methacrylate is copolymerized with a vinyl monomer in the first stage and the fluoroolefin in the second stage has the structural formula

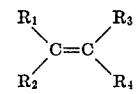

wherein
   (a) $R_1$ is fluorine,
   (b) $R_2$ is selected from the group consisting of hydrogen, fluorine and chlorine,
   (c) $R_3$ is selected from the group consisting of hydrogen, fluorine, chlorine and a $C_1$–$C_4$ alkyl, and
   (d) $R_4$ is selected from the group consisting of hydrogen, fluorine, chlorine, a $C_1$–$C_4$ alkyl, phenyl and a halogenated phenyl,
and the reaction in the second stage is at a pressure of at least 300 p.s.i.
4. The process of claim 3 in which the polymerization initiator is selected from the group consisting of ultraviolet radiation, high energy radiation, an alkali metal persulfate, and a mixture of an alkali metal persulfate and an inorganic reducing agent.
5. The process of claim 1 in which
   (a) methyl methacrylate is homopolymerized in the presence of a mixture of an alkali metal persulfate and an inorganic reducing agent, said mixture being present in an amount of about 0.5 to 3.0 weight percent based on the weight of said methyl methacrylate, and
   (b) stage two comprises reacting the resulting polymethyl methacrylate with a fluoroolefin compound in an aqueous emulsion, said fluoroolefin compound having the structural formula

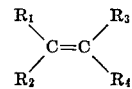

wherein
   (1) $R_1$ is fluorine,
   (2) $R_2$ is selected from the group consisting of hydrogen, fluorine and chlorine, and
   (3) $R_3$ and $R_4$ are individually selected from the group consisting of hydrogen, fluorine, chlorine and a $C_1$–$C_4$ alkyl,
by heating a mixture of these to a temperature of about 70° C. to 90° C. and maintaining the pressure of the reaction mixture at about 500 to 5000 p.s.i.
6. The two-stage process of claim 5 wherein the fluoroolefin compound of step (b) is vinyl fluoride.

7. The two-stage process of claim 5 wherein the fluoroolefin compound of step (b) is vinylidene fluoride.

8. The two-stage process of claim 5 wherein the fluoroolefin compound of step (b) is tetrafluoroethylene.

References Cited

UNITED STATES PATENTS

| 3,026,289 | 3/1962 | Coover | 260—884 |
| 3,037,948 | 6/1962 | Landler et al. | 260—884 |
| 3,065,157 | 11/1962 | Busse | 260—884 |
| 3,068,187 | 12/1962 | Bolstad | 260—296 |
| 3,222,423 | 12/1965 | Roebuck | 260—877 |

MURRAY TILLMAN, *Primary Examiner.*

J. T. GOOLKASIAN, *Assistant Examiner.*